UNITED STATES PATENT OFFICE.

FRITZ HABER, OF KARLSRUHE, AND ROBERT LE ROSSIGNOL, OF BERLIN, GERMANY, ASSIGNORS TO BADISCHE ANILIN & SODA FABRIK, OF LUDWIGSHAFEN-ON-THE-RHINE, GERMANY, A CORPORATION.

PROCESS OF MAKING AMMONIA.

999,025.      Specification of Letters Patent.     Patented July 25, 1911.

No Drawing.     Application filed May 18, 1910. Serial No. 562,094.

*To all whom it may concern:*

Be it known that we, FRITZ HABER, Ph. D., professor of chemistry, and ROBERT LE ROSSIGNOL, B. Sc., chemist, subjects, respectively, of the King of Prussia and the King of England, residing, respectively, at Karlsruhe and Berlin, Germany, have invented new and useful Improvements in Processes of Making Ammonia, of which the following is a specification.

Our invention relates to the manufacture of ammonia by passing a mixture of hydrogen and nitrogen in the gaseous condition over a catalytic agent consisting of or containing uranium. We have found that such catalytic agent consisting of or containing uranium induces the reaction, forming ammonia at comparatively low temperature, and this is particularly important because at higher temperatures the concentration which the ammonia can arrive at in the gases diminishes considerably.

In carrying out our invention it is preferred to conduct the process with the gases subjected to high pressure, for instance at a pressure of from 100 to 200 atmospheres. It is preferred to use gases consisting of nitrogen and hydrogen in combining proportions, that is to say, one volume of nitrogen to three volumes of hydrogen, and suitable temperatures for carrying out the reaction lie between five hundred and six hundred degrees centigrade, although ammonia is formed in considerable quantities even below five hundred degrees centigrade. As uranium tends to lose its efficiency as a catalytic agent, if it be converted into its oxid, it is desirable that the presence of steam and water, or bodies which give rise to steam and water, should be avoided. Either metallic uranium, uranium nitrid, or alloys containing uranium, can be employed, and if desired these bodies can be mixed with other bodies, for instance with an indifferent body such as clay, asbestos, quartz, or indifferent metals, or the uranium (either as the metal or the nitrid, or as an alloy) can be used in admixture with other bodies which also have a catalytic action; for example uranium-manganese may be used.

The percentage of uranium contained in the alloys and mixtures used according to this invention can be very widely varied. A suitable alloy is for instance one containing seventy per cent. of uranium and thirty per cent. of manganese.

When carrying out our invention, it is not necessary that the uranium be prepared in the form of metal, alloy, or nitrid, before it is introduced into the apparatus in which it is used for the production of ammonia, as, if desired, the conversion of any suitable uranium compound into the form necessary for catalysis can be effected in the contact apparatus itself. For instance if uranium carbid be introduced into the apparatus and a current of nitrogen and hydrogen gases be passed over it at an elevated temperature, it breaks down to a fine powder which contains uranium nitrid and which, as a catalytic agent, is even more effective than is metallic uranium. The uranium containing carbid which can be prepared in an electric furnace according to the method proposed by Moissan behaves in a similar manner.

Now what we claim is:—

1. The process of producing ammonia by passing a gaseous mixture containing nitrogen and hydrogen, but free from oxygen, over a heated catalytic agent containing uranium.

2. The process of producing ammonia by passing a gaseous mixture containing nitrogen and hydrogen, but free from oxygen, over a heated catalytic agent containing uranium, while carrying out the reaction under pressure.

3. The process of producing ammonia by passing a gaseous mixture containing nitrogen and hydrogen, but free from oxygen, over a heated catalytic agent containing uranium, while carrying out the reaction under a pressure of from one hundred to two hundred atmospheres.

4. The process of producing ammonia by passing a gaseous mixture of nitrogen and hydrogen over heated uranium nitrid at a pressure of from one hundred to two hundred atmospheres.

In testimony whereof we have hereunto set our hands in the presence of two subscribing witnesses.

FRITZ HABER.
         ROBERT LE ROSSIGNOL.

Witnesses:
    ERNEST L. IVES,
    W. W. SCHMIDT.